(12) United States Patent
Ali et al.

(10) Patent No.: US 12,378,142 B2
(45) Date of Patent: Aug. 5, 2025

(54) WASTE WATER TREATMENT SYSTEM USING AEROBIC GRANULAR SLUDGE GRAVITY-DRIVEN MEMBRANE SYSTEM

(71) Applicant: King Abdullah University of Science and Technology, Thuwal (SA)

(72) Inventors: Muhammad Ali, Thuwal (SA); Krishna Prasad Katuri, Thuwal (SA); Pascal Elias Saikaly, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 987 days.

(21) Appl. No.: 17/295,625

(22) PCT Filed: Nov. 19, 2019

(86) PCT No.: PCT/IB2019/059940
§ 371 (c)(1),
(2) Date: May 20, 2021

(87) PCT Pub. No.: WO2020/104944
PCT Pub. Date: May 28, 2020

(65) Prior Publication Data
US 2022/0024796 A1     Jan. 27, 2022

Related U.S. Application Data

(60) Provisional application No. 62/769,650, filed on Nov. 20, 2018.

(51) Int. Cl.
*C02F 3/12*       (2023.01)
*B01D 69/02*      (2006.01)
(Continued)

(52) U.S. Cl.
CPC ............ *C02F 3/1273* (2013.01); *B01D 69/02* (2013.01); *C02F 3/006* (2013.01); *C02F 3/1263* (2013.01);
(Continued)

(58) Field of Classification Search
None
See application file for complete search history.

(56) References Cited

U.S. PATENT DOCUMENTS 6,245,239 B1 * 6/2001 Cote .................... B01D 63/026
                                                    210/636
6,406,629 B1 * 6/2002 Husain .................. C02F 3/1268
                                                    210/801

(Continued)

FOREIGN PATENT DOCUMENTS

CN       202671258 U  *  1/2013
CN       103332833       10/2013
(Continued)

OTHER PUBLICATIONS

Ding, et al., "A low energy gravity-driven membrane bioreactor system for grey water treatment: permeability and removal performance of organics", Journal of Membrane Science, 542:408-417 (2017).
(Continued)

*Primary Examiner* — Chester T Barry
(74) *Attorney, Agent, or Firm* — Pabst Patent Group LLP

(57) ABSTRACT

Described herein is aerobic granular sludge gravity-driven membrane system, methods of making and using thereof are described. The aerobic granular sludge (AGS) integrated with a gravity-driven membrane (GDM) filtration system is an energy efficient wastewater treatment system that takes advantage of AGS reactor systems integrated with gravity-driven membrane system to reduce membrane fouling and (Continued)

produce microbiologically and chemically safe water. The AGS-GDM system includes at least an AGS reactor tank containing raw wastewater and granular sludge and a membrane tank including one or more gravity-driven membrane(s).

16 Claims, 4 Drawing Sheets

(51) Int. Cl.
  *C02F 3/00* (2023.01)
  *C02F 3/22* (2023.01)
(52) U.S. Cl.
  CPC ...... *C02F 3/223* (2013.01); *B01D 2325/0283* (2022.08); *C02F 2201/004* (2013.01); *C02F 2203/004* (2013.01); *C02F 2203/008* (2013.01); *C02F 2209/005* (2013.01); *C02F 2209/42* (2013.01); *C02F 2301/04* (2013.01); *C02F 2303/20* (2013.01)

(56) References Cited

U.S. PATENT DOCUMENTS

| | | | | |
|---|---|---|---|---|
| 2001/0027951 | A1* | 10/2001 | Gungerich | C02F 1/444 210/321.89 |
| 2003/0159991 | A1* | 8/2003 | Tay | C02F 3/1263 210/620 |
| 2004/0108268 | A1* | 6/2004 | Liu | B01D 61/22 210/903 |
| 2009/0127190 | A1* | 5/2009 | Ong | C02F 3/1273 210/616 |
| 2013/0075327 | A1* | 3/2013 | Yuan | C02F 3/301 210/608 |
| 2015/0336826 | A1 | 11/2015 | Peeters | |
| 2015/0376043 | A1* | 12/2015 | Wett | C02F 11/127 210/601 |
| 2017/0203984 | A1* | 7/2017 | Lee | C02F 3/1268 |
| 2021/0355010 | A1* | 11/2021 | Devlin | C02F 3/006 |
| 2022/0024796 | A1* | 1/2022 | Ali | C02F 3/006 |

FOREIGN PATENT DOCUMENTS

| | | | | |
|---|---|---|---|---|
| CN | 105621615 A | * | 6/2016 | ............ C02F 3/302 |
| JP | 4111579 B2 | * | 7/2008 | |
| WO | WO-9811980 A1 | * | 3/1998 | ........... B01D 61/147 |
| WO | WO-0021890 A1 | * | 4/2000 | ............ B01D 61/18 |
| WO | 2004024638 | | 3/2004 | |
| WO | 2014098769 | | 6/2014 | |

OTHER PUBLICATIONS

Gao, et al., "Aerobic granular sludge: characterization, mechanism of granulation and application to wastewater treatment", Critical Reviews in Biotechnology, 31(2):137-152 (2011).

Huang, et al., "A Comparative Study of Aerobic Granule and Activated Sludge BasedDynamic Membrane Reactors for Wastewater Treatment", J. of Bioproc. & Biotech., 3(2):1000133, 4 pages (2013).

International Search Report for PCT/US2019/059940 dated Jan. 21, 2020.

Li, et al., "Integration of aerobic granular sludge and mesh filter membrane bioreactor for cost-effective wastewater treatment", Bioresource Technology, 122:22-26 (2012).

Liebana, et al., "Integration of aerobic granular sludge and membrane bioreactors for wastewater treatment", Critical Reviews in Biotechnology, 38(6):801-816 (2018).

U.S. EPA: "Energy Efficiency in Water and Wastewater Facilities", U.S. Environ. Prot. Agency (2014).

Wan, et al., "COD capture: A feasible option towards energy self-sufficient domestic wastewater treatment", Sci. Rep., 6:25054 (2016).

Wan, et al., "Design and fabrication of hollow fiber membrane modules", Journal of Membrane Science, 538:96-107 (2017).

Wang, et al., "Gradual adaptation to salt and dissolved oxygen: Strategies to minimize adverse effect of salinity on aerobic granular sludge", Water Res., 124:702-712 (2017a).

Wang, et al., "Gravity-driven membrane system for secondary wastewater effluent treatment: Filtration performance and fouling characterization", Separation and Purification Technology, 184:26-33 (2017b).

Wu, et al., "Improved performance of gravity-driven membrane filtration for seawater pretreatment: Implications of membrane module configuration", Water Research, 114:59-68 (2017).

Wu, et al., "Optimization of gravity-driven membrane (GDM) filtration process forseawater pretreatment", Water Research, 93:133-140 (2016).

Zhang, et al., "Membrane fouling in aerobic granular sludge (AGS)-membrane bioreactor (MBR): effect of AGS size", Water Research, 157:445-453 (2019).

* cited by examiner

WASTE WATER TREATMENT SYSTEM USING AEROBIC GRANULAR SLUDGE GRAVITY-DRIVEN MEMBRANE SYSTEM

CROSS-REFERENCE TO RELATED APPLICATION

The present application is a National Phase application under 35 U.S.C. § 371 of International Application No. PCT/IB2019/059940, filed on Nov. 19, 2019, which claims priority to U.S. Application No. 62/769,650, filed Nov. 20, 2018, the disclosure of which are incorporated herein by reference in their entirety.

FIELD OF THE INVENTION

The invention is generally directed to wastewater treatment system, methods of making and methods of using thereof.

BACKGROUND OF THE INVENTION

Conventional activated sludge (CAS) process has been employed in majority of wastewater treatment plants for more than a century, where organic matter is aerobically converted to biomass and carbon dioxide. It involves air or oxygen being introduced into a biological treatment reactor which contains a mixture of screened or primary treated sewage and biomass, also referred to as activated sludge. The microbes grow as biomass-containing, also referred to as floc, which typically grows in suspension. A subsequent settling tank (secondary clarifier) is used to allow the biological flocs to settle, thus separating the sludge from the treated water. The settled sludge is recycled towards the biological process as return activated sludge (RAS). To keep the biomass in the treatment reactor at a desired level during biomass growth, periodically part of the RAS is wasted as waste activated sludge (WAS).

Although the CAS process is widely used, it has several important operational drawbacks, like: poor settling sludge characteristics, limitation to low MLSS concentrations, and the tendency to develop floating sludge.

Furthermore, the CAS process is an energy intensive process and normally requires 0.3 to 0.6 (typically 0.45) kWh per $m^3$ of wastewater treated, equivalent to 1620 kJ $m^{-3}$. It has been reported that about 3% of the annual electrical energy is consumed for wastewater treatment in the US, resulting in the emissions of more than 45 million tons of greenhouse gases annually (U.S. EPA: "Energy Efficiency in Water and Wastewater Facilities", US Environ Prot Agency (2014)).

Aerobic granular sludge (AGS) technology can outcompete the existing biological wastewater treatment technologies, and it can become the standard for biological wastewater treatment in the future because of its small footprint, less operational cost, effective simultaneous removal of carbon and nutrients (P & N) in a single reactor tank, and ability to withstand toxic shock loading (Pronk, M., et al., "MCM: Full scale performance of the aerobic granular sludge process for sewage treatment", *Water Res.* 84:207-217 (2015) ("Pronk, et al.")). Currently, there are more than 50 full-scale AGS installations worldwide, and the number is multiplying rapidly. Similarly, the AGS based system was estimated to have a 40-50% smaller footprint as compared to the conventional activated sludge process (Pronk, et al.). However, effluent of AGS reactors still contain flocs and/or broken granules as suspended solids. A higher-grade effluent is required to meet strict effluent quality or reuse standards. For example, based on the USEPA standards, effluents qualities from sewage treatment plant should meet turbidity≤2 (NTU), BOD≤10 (mg/l), and Fecal coliforms (MPN/100 ml) not detectable. These criteria cannot be achieved with the CAS or AGS technology alone. Effluents generated from AGS for example, contain suspended/floc solids, in that scenario, effluents produced from these reactors can't meet water reuse standards.

In order to meet stringent wastewater treatment regulations, membrane bioreactor (MBR) technology is getting prevalent for wastewater treatment and to reclaim water as an alternate to CAS process. However, the MBR process has important operational drawbacks such as high membrane fouling, and is even a more energy intensive (energy-driven membrane filtration) process than CAS. On average MBR process requires 0.62 kWh per $m^3$ of wastewater treated, equivalent to 2232 kJ $m^{-3}$ (Bengtsson, S., et al., "A comparison of aerobic granular sludge with conventional and compact biological treatment technologies", *Environ Technol.* 0:1-10 (2018) ("Bengtsson, et al.") and Wan, J., et al., "COD capture: A feasible option towards energy self-sufficient domestic wastewater treatment", *Sci. Rep.,* 6:1-9 (2016)).

A recent study evaluated electricity demand for various wastewater treatment technologies and concluded that a treatment process based on AGS has lower electricity requirement compared to (23%) activated sludge and (50-70%) well-optimized MBRs (Bengtsson, et al.). Nevertheless, to achieve microbiologically safe reusable effluent, further polishing would be required for the AGS treated effluent.

Therefore, there is a need for an energy efficient wastewater treatment wherein the energy input for water reclamation followed by wastewater treatment is minimal over conventional aerobic treatment systems.

There is a further need for reducing membrane fouling to efficiently produce microbiologically safe and reusable water.

There is a further need to efficiently remove pollutants from the wastewaters with less operational costs and that require less area (smaller footprint) as compared to conventional wastewater treatment systems.

SUMMARY OF THE INVENTION

A wastewater treatment system using aerobic granular sludge (AGS) coupled with submerged gravity-driven membrane (GDM) system, methods of making and using thereof are described.

The wastewater treatment system typically includes (a) an aerobic granular sludge (AGS) tank and (b) a GDM tank.

The AGS tank and GDM tank may be physically separated, for example, the AGS tank and GDM tank are in two separate vessels (i.e., the AGD tank and GDM tank do not share a wall) (e.g., see FIG. 1). Optionally, the system includes a first connector for connecting the AGS tank and GDM tank. The connector is generally an open conduit, such as a pipe or tube.

Alternatively, the AGS tank and GDM tank are integrated in one vessel, in which a barrier, such as a baffle-wall, divides the vessel into an AGS tank and a GDM tank (e.g., see FIG. 6).

The AGS tank includes granular biomass. The granular biomass has at least one characteristic selected from the group consisting of a Sludge Volume Index (SVI) less than 70 ml/g; an average biomass concentration between 5 and 8 kg m$^{-3}$; an average particle size between 0.2 and 2 mm; and a settling velocity between 1.5 and 24 m/h.

The GDM tank includes one or more gravity-driven membranes. The one or more gravity-driven membranes can form a membrane unit. Typically, the membrane unit is attached at the bottom or near the bottom of the GDM tank. The membrane unit is typically in a plane parallel to the plane of the bottom of the GDM tank.

Optionally, the system can include an influent tank, a sludge tank, a treated water tank, and/or a control unit.

GDM Tank

The influent tank is configured to hold raw wastewater or primary treated raw wastewater. Optionally, the influent tank is connected to the AGS tank through a second connector. Optionally, the influent tank is connected to an influent pump, which in turn connected to the influent tank through a second connector.

The treated water tank is configured to collect permeate from the GDM tank. Optionally, the treated water tank is connected to the GDM tank through a third connector.

The sludge tank is configured to receive excess sludge from the AGS tank. Optionally, the sludge tank is connected to the AGS tank through a fourth connector.

The control unit includes one or more controllers and/or one or more gauges to regulate and/or control the AGS tank, GDM tank, influent tank, sludge tank, and/or treated water tank.

Also disclosed is a method of treating wastewater using a wastewater treatment system which includes (a) an aerobic granular sludge (AGS) tank and (b) a GDM tank. The method generally includes the steps of: (i) cultivating aerobic granular biomass for example, with wastewater, in the AGS tank, and (ii) filtering effluent from the AGS tank in the GDM tank.

Generally, step (i) cultivating aerobic granular biomass with wastewater in the AGS tank includes (1) feed, (2) aeration, (3) settling, and (4) draw. Steps (1)-(4) can be repeated in the same order. In embodiments where steps (1)-(4) are repeated, step (1) feed and step (4) draw can occur simultaneously, substantially simultaneously, or sequentially. Optionally, step (i) is performed using a sequential batch reactor (SBR) system.

Generally, the effluent from the AGS tank is drawn into the GDM tank. Typically, effluent from the AGS tank overflows from the top of the AGS tank into the GDM tank directly or through a first connector that connects the AGS tank with the GDM tank.

Optionally, the method includes collecting permeate (filtered effluent) from the GDM tank in a treated water tank during or after step (ii). Typically, the permeate flows from the GDM tank into the treated water tank through a third connector that connects the GDM tank and the treated water tank.

The process disclosed herein results in the porous membrane(s) in the GDM tank having minimal and/or slow fouling. The AGS/GDM system can be designed to meet different scales of treatment. It can be designed as a packed containerized unit, which makes the entire system mobile and modular. Further, multiple containerized units can be installed in parallel to meet growing demand Besides, the AGS/GDM system can also be used as a centralized wastewater treatment unit to expand the capacity of existing centralized treatment units or as a new centralized treatment unit. The effluent produced from AGS/GDM system used for non-potable re-use application such as toilet flushing, floor washing, irrigation, etc.

DETAILED DESCRIPTION OF THE INVENTION

I. Definitions

Figure 1:
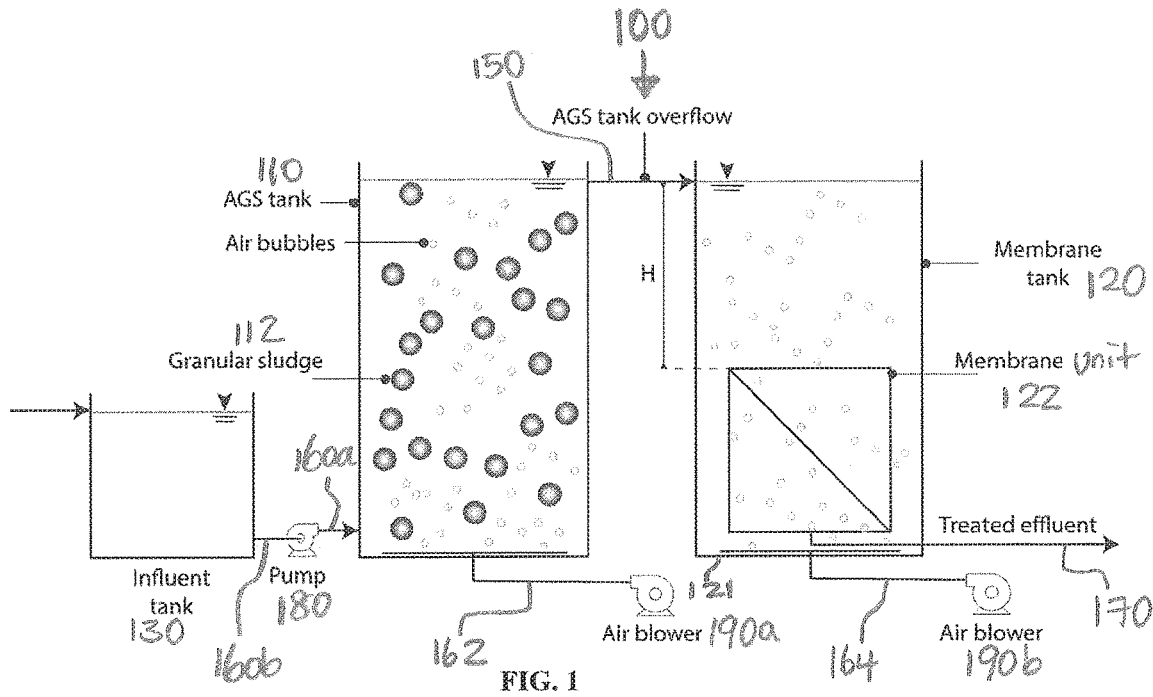
FIG. 1 are schematics of a cross-sectional view of an exemplary wastewater treatment system that includes an aerobic granular sludge tank (AGS) and a submerged gravity-driven membrane (GDM) tank. The AGS tank and GDM tank are physically separated and connected by a pipe.

As used herein the term "Sludge Volume Index (SVI)", is the volume in milliliters occupied by 1 g of a suspension after 5 min settling.

"Permeate", as used herein, refers to water from which some or all pollutants have been removed. The purity of the water may be defined by the content of Total Organic Carbon (TOC) or by transmission of visible light of 550 nm wavelength through the water sample (percent transmittance, % T). When TOC is used to define water purity, the "permeate" or "purified water" refers to water that has at least 50% less TOC than the original water. When percent transmittance is used to define water purity, the "permeate" or "purified water" refers to water that has at least 50% greater percent transmittance than the original water. It is understood that since what constitutes a contaminant in water depends on what is subjectively considered undesirable, pure water herein can refer to water that includes solutes and other materials not considered contaminants in the context at hand.

Quantification of the extent of purification of wastewater after treatment with the composition can be achieved by estimation of parameters which include but are not limited to Chemical Oxygen Demand (COD), Total Suspended Solids (TSS), Total Dissolved Solids (TDS), color, and odor. Quantification is done initially at the inlet of a desired stage at which the measurement is required and is prior to the treatment of the sample with the composition. The quantification is again done at the outlet of the desired stage after a predetermined duration of reaction time to determine the extent of purification. The measurement is expressed as percentage decrease of parameters and is calculated from the difference in values of parameters before and after the treatment.

"Wastewater" as used herein, may be used to refer to any solution that has water as a primary component and is a discharge or effluent that includes one or more contaminants.

"Pollutant" as used herein refers to any substance or substances that are not desired in composition, material, location, etc., such as water. For example, a substance or substances not considered environmentally safe for direct discharge into a drain or surface water bodies or other potable water systems or land can be considered a pollutant. Such substances include, but are not limited to, ions, organics, biochemical reagents, heavy metals, heavy metal complexes, inorganic salts, inorganic reagents, dissolved and colloidal natural organic matter, clays, silicas, and any other chemically or biologically active bodies.

Numerical ranges disclosed in the present application include, but are not limited to, ranges of temperatures, ranges of concentrations, ranges of integers, ranges of times, and ranges of temperatures, etc. The disclosed ranges of any type, disclose individually each possible number that such a range could reasonably encompass, as well as any sub-ranges and combinations of sub-ranges encompassed therein. For example, disclosure of a temperature range is intended to disclose individually every possible temperature value that such a range could encompass, consistent with the disclosure herein.

Use of the term "about" is intended to describe values either above or below the stated value, which the term "about" modifies, in a range of approx. +/−10%; in other instances the values may range in value either above or below the stated value in a range of approx. +/−5%. When the term "about" is used before a range of numbers (i.e., about 1-5) or before a series of numbers (i.e., about 1, 2, 3, 4, etc.) it is intended to modify both ends of the range of numbers or each of the numbers in the series, unless specified otherwise.

II. Wastewater Treatment Systems

Wastewater treatment systems using aerobic granular sludge (AGS) coupled with submerged gravity-driven membrane (GDM) filtration (AGS-GDM system) are described.

The AGS-GDM system effectively removes pollutants from the raw sewage for water reclamation and reuse.

This AGS-GDM system can efficiently remove pollutants from wastewater with less capital and operational costs and require less area (smaller footprint) as compared to conventional wastewater treatment systems, such as conventional activated sludge (CAS) process and membrane bioreactors (MBRs). The AGS-GDM system disclosed herein provides water/effluent qualities from sewage treatment plants as per the USEPA (The United States Environmental Protection Agency) standards; Turbidity (NTU): ≤2; BOD (mg/l): ≤10; Fecal coliforms (MPN/100 ml): Not detectable range.

The AGS-GDM design is simple and compact, which reduces the footprint associated with construction.

AGS-GDM system can replace conventional MBR technology in the wastewater treatment and reclamation market.

AGS process generally produces effluent with high total suspended Solids (TSS) concentrations, and requires to be further polished to make it reusable. The GDM filtration process operates at an ultra-low gravity-driven pressure (40-60 mbar) with less maintenance as compared to conventional membrane filtration systems (Peter-Varbanets, et al., *Water Res.*, 43:245-265 (2009)), consequently, requiring minimal energy. The GDM process has a wide spectrum for water treatment and mainly shows potential in water treatment and seawater pre-treatment for succeeding a reverse osmosis (RO) treatment (Peter-Varbanets, et al.,", *Water Res.*, 44:3607-3616 (2010)).

The wastewater treatment system described herein produces water that meets stringent effluent quality standards and to reclaim microbially and chemically safe water for various non-potable and indirect potable uses. For example, the wastewater treatment system can produce higher-grade water that meets the USEPA standards: turbidity≤2 (NTU), BOD≤10 (mg/l), and Fecal coliforms (MPN/100 ml) not detectable.

The wastewater treatment system typically includes (a) an aerobic granular sludge (AGS) tank and (b) a GDM tank. Exemplary systems are illustrated in FIGS. 1 and 5.

The AGS tank and GDM tank may be physically separated, for example, the AGS tank and GDM tank are in two separate vessels (i.e., the AGS tank and GDM tank do not share a wall) (e.g., see FIG. 1, AGS tank 110 and GDM tank 120). In cases where the AGS tank and GDM tank are physically separated, the system can include a first connector that connects the AGS tank and GDM tank (e.g., see FIG. 1, 150). The connector is generally an open conduit, such as a pipe or tube.

Figure 5:
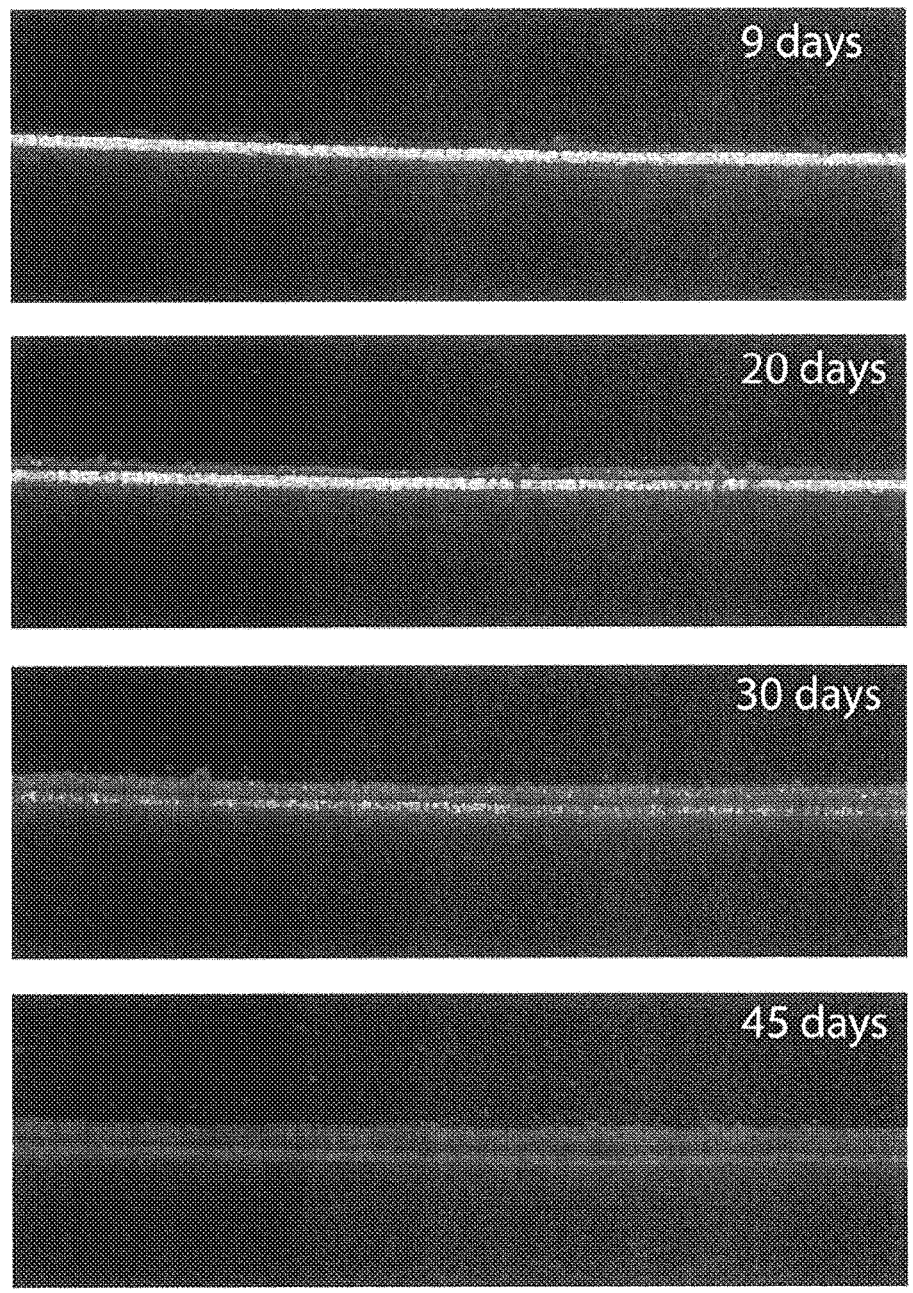
FIG. 5 shows the time course evolution of fouling morphology on a flat sheet membrane by optical coherence tomography (OCT) scanning in AGS-GDM system.

Alternatively, the AGS tank and GDM tank are integrated in a single vessel, in which a barrier, such as a baffle-wall, divides the vessel into an AGS tank and a GDM tank (e.g., see FIG. 5, AGS tank 110' and GDM tank 120' are integrated in a single vessel 102).

Typically, the height of the AGS tank provides sufficient water pressure head in GDM tank to drive filtration through gravity (without or with minimal energy input, e.g., less than 60 mbar pressure).

Optionally, the system can include an influent pump, and at least one air blower. The influent pump is generally coupled to the AGS tank and configured to feed wastewater or primarily treated wastewater into the AGS tank. The one or more air blowers are generally coupled to the AGS tank and/or the GDM tank, and configured to supply air to the AGS tank and/or GDM tank.

Optionally, the wastewater treatment system can include an influent tanka sludge tank, a treated water tank, and/or a control unit.

A. Aerobic Granular Sludge (AGS) Tank

The AGS tank includes granular biomass. The granular biomass has at least one characteristic selected from the group consisting of a Sludge Volume Index (SVI) less than 70 ml/g; an average biomass concentration between 5 and 8 kg m$^{-3}$; an average particle size between 0.2 and 2 mm; and a settling velocity between 1.5 and 24 m/h.

1. AGS Tank Specifications

Figure 3:
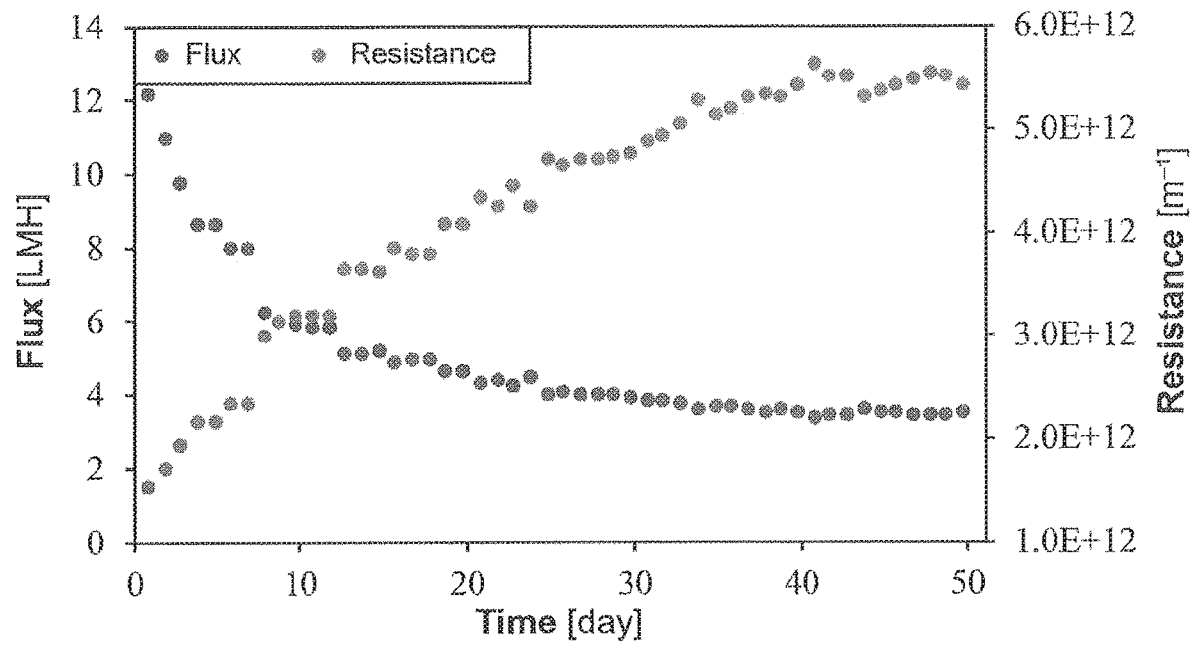
FIG. 3 is a graph of the variations of flux and resistance.

The AGS tank can have any suitable shape and dimension for treating wastewater. For example, the AGS tank can have a dimension suitable for a portable device, or a dimension suitable for immobilized use in a plant. Exemplary shapes for the AGS tank include, but are not limited to, regular shapes, such as rectangular, cubical, cylindrical, and irregular shapes. An exemplary AGS tank 110" having a cylindrical shape is illustrated in FIG. 3.

Generally, the AGS tank has a height between about 0.1 meter and about 10 meters. For example, the AGStank can have a height up to 8 meters, up to 7 meters, up to 5 meters, at least 0.1 meter, at least 0.5 meter, at least 1 meter, at least 1.5 meters, at least 2 meters, at least 2.5 meters, at least 3 meters, at least 3.5 meters, at least 4 meters, between 1 and 2 meters, between 1 and 3 meters, between 1 and 4 meters, between 1 and 5 meters, between 1 and 6 meters, between 1 and 7 meters, between 1 and 8 meters, between 1 and 9 meters, or between 1 and 10 meters, such as 0.1 meter, 0.5 meter, 1 meter, 2 meters, 3 meters, 4 meters, 5 meters, 6 meters, 7 meters, 8 meters, 9 meters, or 10 meters. Optionally, the AGS tank has a height up to 5 meters. In some embodiments, the AGS tank has a height of at least 1 meter.

2. Aerobic Granular Sludge

Aerobic granular sludge (AGS) is a microbial community which allows simultaneous removal of carbon, nitrogen, phosphorus and other pollutants in a single sludge system.

AGS is distinct from activated sludge in physical, chemical and microbiological properties. Aerobic granules are distinguished from activated sludge flocs through their larger size and more compact and spherical structure. Granular sludge is a type of conglomerate formed by microorganisms and has a granular appearance; their shape does not rely on the presence of water and they can withstand a certain amount of pressure.

In 2005, the International Water Association (IWA) held the first session of aerobic granular sludge seminars at the Technical University of Munich in Germany, and a clear definition of aerobic granular sludge was established, i.e., granules making up aerobic granular activated sludge are to be understood as aggregates of microbial origin, which do not coagulate under reduced hydrodynamic shear, and which settle significantly faster than activated sludge flocs. Reviewed by Gao, et al., *Critical Reviews in Biotechnology*, 31(2): 137-152 (2011), granular sludge is a special type of biofilm in which biomass grows in compact aggregates (granules) without any carrier material. From a microbiological point of view, granules consist of different layers where diverse microorganisms can be present as well as different reactions can take place.

The granular biomass has at least one characteristic selected from the group consisting of a SVI less than 70 ml/g, such as between 10 and 70 ml/g, between 10 and 65 ml/g, between 10 and 60 ml/g, between 10 and 55 ml/g, between 10 and 50 ml/g, between 10 and 450 ml/g, between 10 and 40 ml/g, between 10 and 35 ml/g, or between 10 and 30 ml/g; an average biomass concentration between 2 and 10 kg m$^{-3}$, preferably, between 5 and 8 kg m$^{-3}$; an average particle size between 0.05 mm and 5 mm, preferably between 0.2 and 2 mm; and a settling velocity between 1 and 50 m/h, such as between 1 and 45 m/h, between 1 and 40 m/h, between 1 and 35 m/h, between 1 and 30 m/h, between 1 and 25 m/h, between 1.5 and 50 m/h, between 1.5 and 40 m/h, between 1.5 and 35 m/h, between 1.5 and 30 m/h, between 2 and 50 m/h, between 2 and 45 m/h, between 2 and 40 m/h, between 2 and 35 m/h, between 2.5 and 50 m/h, or between 2.5 and 45 m/h, preferably between 1.5 and 24 m/h.

Methods for making granular biomass with at least one of these characteristics are known in the art (WO 2004/024638 by Van Loos-Drecht, et al.).

B. GDM Tank

The GDM tank includes one or more gravity-driven membrane(s). The one or more gravity-driven membrane(s) can form a membrane unit.

1. GDM Tank Specifications

The GDM tank can have any suitable shape and dimension for gravity-driven filtration of wastewater. For example, the GDM tank can have a dimension suitable for a portable device, or a dimension suitable for immobilized use in a plant. Exemplary shapes for the GDM tank include, but are not limited to, regular shapes, such as rectangular, cubical, cylindrical, and irregular shapes. An exemplary GDM tank 120" having a cylindrical shape is illustrated in FIG. 3. The GDM tank may have the same, substantially the same, or a different shape than the AGS tank.

Generally, the GDM tank has a height between about 0.1 meter and about 10 meters. For example, the GDM tank can have a height up to 8 meters, up to 7 meters, up to 5 meters, at least 0.1 meter, at least 0.5 meter, at least 1 meter, at least 1.5 meters, at least 2 meters, at least 2.5 meters, at least 3 meters, at least 3.5 meters, at least 4 meters, between 1 and 2 meters, between 1 and 3 meters, between 1 and 4 meters, between 1 and 5 meters, between 1 and 6 meters, between 1 and 7 meters, between 1 and 8 meters, between 1 and 9 meters, or between 1 and 10 meters, such as 0.1 meter, 0.5 meter, 1 meter, 2 meters, 3 meters, 4 meters, 5 meters, 6 meters, 7 meters, 8 meters, 9 meters, or 10 meters. Optionally, the AGS tank has a height up to 5 meters. In some embodiments, the GDM tank has a height of at least 1 meter. The GDM tank may have the same, substantially the same, or a smaller height than the AGS tank.

2. Membrane(s)

The GDM tank includes one or more membranes. More than one membranes can form a membrane unit. The membranes in a membrane unit are generally parallel to one another.

a. Materials

The membrane for use in the GDM tank are typically porous membrane(s) with a large enough surface area for intercepting suspended solids (SS) in the effluent.

The porous membrane(s) generally have a pore size of less than 1 µm (i.e., average diameter of the pore is less than 1 micron µm). For example, the porous membrane can have a pore size up to 0.9 µm, up to 0.8 µm, up to 0.7 µm, up to 0.6 µm, up to 0.5 µm, up to 0.4 µm, up to 0.3 µm, up to 0.2 µm, up to 0.1 µm, up to 0.05 µm, up to 0.01 µm, up to 5 nm, up to 1 nm, between 1 nm and 1 µm, between 0.01 µm and 1 µm, between 0.01 µm and 0.5 µm, 0.05 µm to 1 µm, between 0.1 µm and 1 µm, or between 0.2 µm and 1 µm.

The membranes used in this system are distinct from a mesh, which would have bigger pores. Thus, the GDM tank preferably does not include a mesh such as a nylon mesh (Li et al., *Bioresource Technology*, 122:22-26 (2012)).

Suitable porous membranes include porous membranes made of inorganic or organic porous materials, such as ceramic or polymer based materials. Exemplary membrane polymer materials include, but are not limited to, cellulose acetate, polyvinylidene fluoride, polyvinyl chloride, polyacrylonitrile, polypropylene, polyethylene, polysulfone, polyether sulfone, Polytetrafluoroethylene or other polymers.

b. Modules

The membrane unit may include single membrane module or more than one membrane modules. For example, two or more membranes have the same or similar first module, and one or more membranes have a second module that is different than that of the first module.

Each of the membranes in the membrane unit may be configured as (1) long cylinders such as hollow fiber bundles, or modules, (2) as sheets such as rolled or flat sheets, or (3) as monolithic. The membrane shape may include flat sheet, tubular, hollow fiber, or monolith.

The membrane module may include hollow-fiber module, tubular, plate and frame, or spiral-wound. Flat sheets may be used to form plate and frame modules. The flat sheets may be circular, square, or rectangular. Flat sheets may also be used to form spiral wound modules.

For example, the membrane unit can include a flat-sheet membrane module and/or a hollow fiber membrane module (Wu, et al., *Water Research*, 114:59-68 (2017), Ding, et al., *Journal of Membrane Science*, 542:408-417 (2017), Wu, et al., *Water Research*, 93:133-140 (2016), and Wan, et al., *Journal of Membrane Science*, 538:96-107 (2017)).

More than one membrane module in a membrane unit can be arranged horizontally or vertically.

c. Dimension

The membrane unit typically has an overall height about less than 20% of the height of the GDM tank, such as less than 15%, less than 10%, less than 5%, between 1% and 20%, between 1% and 15%, between 1% and 10%, or between 5% and 20% of the height of the GDM tank.

d. Location

Typically, the membrane or membrane unit is attached at the bottom or near the bottom of the GDM tank. The membrane unit is typically in a plane parallel to the plane of the bottom of the GDM tank.

3. Location of the Connector

The GDM tank is configured to receive effluent from the AGS tank. Typically, the effluent flows from the AGS tank into the GDM tank via the top of the GDM tank.

In cases where the AGS tank and GDM tank are integrated in one vessel, and divided by a barrier (e.g., see FIG. 5), the effluent from the AGS tank can directly overflow into the GDM tank via the top of the GDM tank.

In cases where the AGS tank and GDM tank are physically separated (e.g., the AGS tank and GDM tank are in two separate vessels; see also FIG. 1), the system can include a connector that connects the AGS tank and GDM tank. The connector is generally an open conduit, such as a pipe or tube. The connector is configured such that effluent from the AGS tank can flow into the GDM tank via the top of the GDM tank through the connector.

Generally, the connector is located at a position ≥50% of the height of the AGS tank, such as at least 55%, at least 60%, at least 65%, at least 70%, at least 75%, at least 80%, at least 85%, at least 90%, at least 95%, or close to 100% of the height of the AGS tank, measured from the bottom of the AGS tank. Such a position is preferred to retain granular biomass in the AGS tank.

The position of the connector on the GDM tank may be at a height that is the same or similar to the position of the connector on the AGS tank, such that the connector has a leveled or substantially leveled configuration. For example, the connector is located at a position about 70% of the height of the AGS tank (measured from the bottom of the AGS tank), it is also located at a position on the GDM tank about 70% of the height of the AGS tank (measured from the bottom of the GDM tank).

Alternatively, the connector can have a slanting configuration such that its position on the AGS tank is higher than its position on the GDM tank.

C. Optional Components

1. Air Blower

Optionally, the wastewater treatment system includes one or more air blowers. The one or more air blowers can be connected to the AGS tank and/or GDM tank such that they blow air into the AGS tank and/or GDM tank. The AGS tank receives air for aeration and suspension of the granular sludge in the tank. The GDM tank receives air for scouring porous membrane biofoulants.

Preferably, the air blow is an air pump.

Preferably, at least one air blower is connected to the AGS tank. Optionally, at least one air blower is connected to the AGS tank and at least one air blower is connected to the GDM tank.

The air blower(s) may be connected to the AGS tank and/or GDM tank at any suitable position on the AGS/GDM tank, but preferably to the bottom of the AGS/GDM tank.

Optionally, each of the one or more air blowers is connected to the AGS tank and/or GDM tank through a connector, such as a tube or pipe.

Optionally, the AGS tank and/or GDM tank include one or more air diffusors. Each of the one or more air diffusors can be connected to an air blower through a connector.

2. Influent Pump

Optionally, the wastewater treatment system includes an influent pump. The influent pump is typically connected to the AGS tank such that wastewater or primarily treated wastewater is fed into the AGS tank through the influent pump. The influent pump may be connected to the AGS tank at any position on the AGS tank, but preferably to the bottom of the AGS tank. The influent pump Optionally, the influent pump is connected to the AGS tank through a connector, such as a tube or pipe.

3. Influent Tank

The wastewater can include an influent tank. Typically, the influent tank is coupled to the AGS tank. The influent tank is for holding raw wastewater or primarily treated raw wastewater, which is fed into the AGS tank.

Generally, the influent tank is connected to the AGS tank by a connector, such as a tube or a pipe. The connector can locate at any suitable position on the influent tank and AGS tank. Preferably, the connector connects to the bottom or a position near the bottom of the AGS tank. Optionally, the influent tank may be connected to the AGS tank via an influent pump, where the influent tank is connected to the influent pump, which in turn connected to the influent tank, by a second connector.

The influent tank can include a level transmitter to control the actuation of the influent pump, where the influent pump stops if liquid level goes below a dead level. "Dead level" generally refers to the minimal wastewater liquid-level that should be maintained in the tank to allow liquid in-flow through the pump and maintain the functionality of the pump.

The influent tank may hold wastewater or primarily treated wastewater at a volume at least 20%, at least 25%, at least 30%, up to 70%, up to 65%, up to 60%, up to 55%, up to 50%, up to 45%, up to 40%, or between about 30% to 60%, between 30% to 55%, between 30% to 50%, between 35% to 50%, between 35% to 55%, between 30% to 45%, between 30% to 40%, between 35% to 45%, between 35% to 40%, between 45% to 55%, or between 40% to 50% of the AGS tank volume to minimize the variability of wastewater flow rates and composition.

4. Sludge Tank

In some preferred embodiments, the AGS tank is configured for efflux of biomass having smaller particle size (diameter <0.2 mm) and lower settling velocity (less than 3 m/h) biomass from the AGS tank (for example, using a connector, such as a tube or pipe) to maintain average biomass concentration between 5 to 8 kg m$^{-3}$ in the AGS tank.

In these embodiments, the AGS reactor tank may also be connected to a sludge tank through a connector. The connector can locate at, for example, between 25% to 60%, between 30% to 60%, between 40% to 60%, between 40% to 50%, between 45% to 65%, or between 45% to 55% of the height of the AGS tank (measured from the bottom of the tank), such as at 30%, 35%, 40%, 45%, 50%, 55%, 60%, or 65% of the height of the AGS reactor tank to collect the biomass efflux from the AGS rector tank. Preferably, the AGS tank may be connected to a sludge tank at approximately 50% of the height of the AGS tank for disposing of surplus biomass having lower particle size to maintain average biomass concentration between 5 to 8 kg m$^{-3}$.

5. Treated Water Tank

The wastewater treatment system can include a treated water tank. The treated water tank is configured to receive permeate from the GDM tank. The treated water tank can be a storage tank. Generally, the treated water tank is connected to the GDM tank through a connector, such as a tube or pipe. Preferably, the connector is located at or near the bottom of the GDM tank.

Alternatively, the permeate from the GDM tank can be directly reused for non-potable and/or indirect potable applications.

6. Control Unit

The wastewater treatment system can include a control unit. The control unit includes one or more controllers and/or one or more gauges.

For example, the control unit can include a graphical program to measure, record, and regulate parameters in the AGS tank, influent tank, GDM tank, and/or treated water tank.

The control unit includes, but is not limited to, an influent pump switch, an air pump switch, a tank purge switch, controls to regulate culture parameters, and/or controls to operate the sequential operational modes in the AGS tank.

Optionally, the wastewater system also includes one or more sensors and/or one or more actuators operably connected to the control unit. The one or more sensors and/or actuators can locate on the wall of the tank, the bottom of the tank, or dispersed in the tank that can float in the wastewater during operation. The one or more sensors and/or actuators can monitor one or more parameters related to conditions within the tank(s), such as temperature, pH, DO, MLSS, TOC, ammonium, and water level in the tank(s).

The control unit may receive one or more parameters from the sensor(s) and/or actuator(s), and regulate the temperature, pH, DO, MLSS, TOC, ammonium, and water level in the AGS tank, influent tank, GDM tank, treated water tank, and/or in response to the received parameter(s). A human machine interface can be used to automatically measure, record and regulate pH, DO, MLSS, TOC, ammonium and water level with sensors and actuators through customized engineering user interfaces.

The control unit may also control the AGS tank sequential operational modes by a programmable logic controller system.

D. Exemplary Waste Water Treatment Systems

Figure 2:
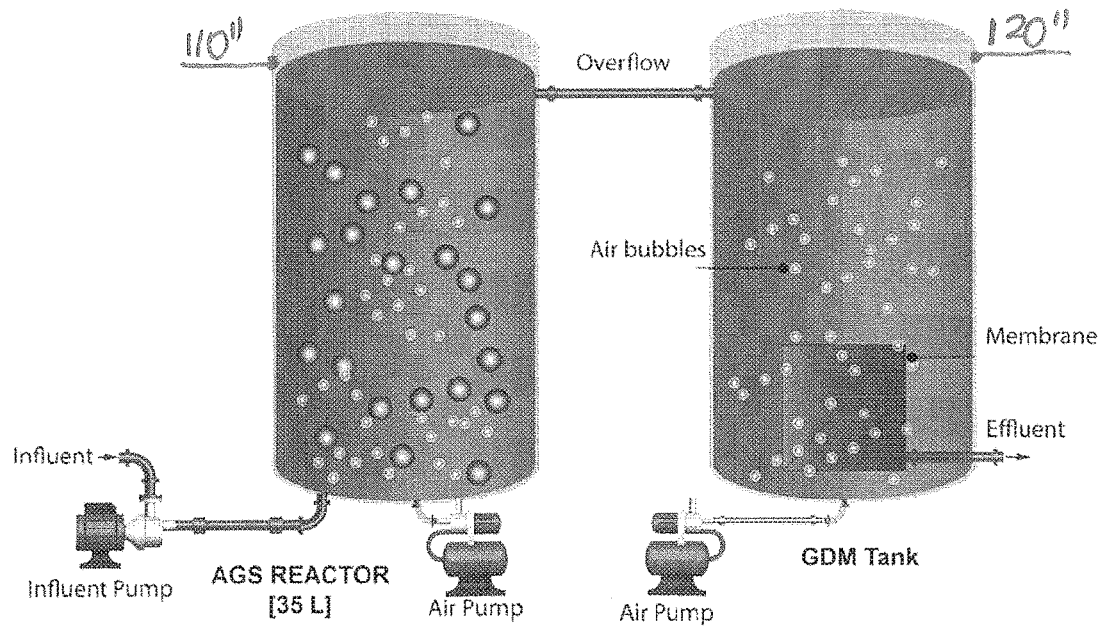
FIG. 2 shows a schematic of an exemplary wastewater treatment system, where the AGS tank and GDM tank are cylindrical in shape
Figure 6:
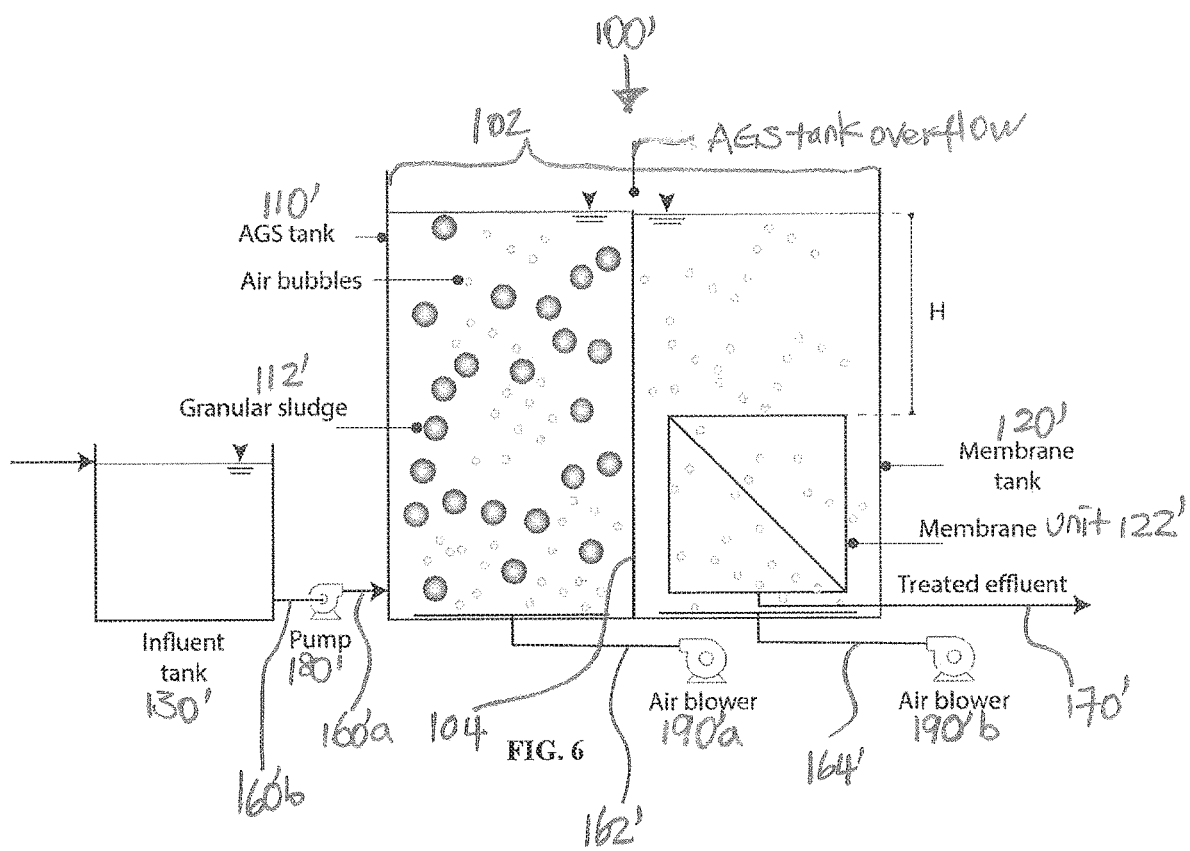
FIG. 6 are schematics of a cross-sectional view of an exemplary wastewater treatment system that includes an AGS tank and GDM tank. The AGS tank and GDM tank are integrated in one vessel. The vessel is divided into the AGS tank and GDM tank by a barrier.

Exemplary wastewater treatment systems are shown in FIGS. 1, 2, and 6.

As shown in FIG. 1, the wastewater treatment system 100 contains an AGS tank 110 and a GDM tank 120. The AGS tank 110 and GDM tank 120 are physically separated (i.e., the AGS tank and the GDM tank are in two separate vessels). The AGS tank 110 contains granular sludge (e.g., 112). The GDM tank 120 contains membrane unit 122, which is attached near the bottom 121 of the GDM tank 120. The membrane unit 122 is parallel to the bottom 121 of the GDM tank 120. The AGS tank 110 and GDM tank 120 are connected by a connector 150 such that the effluent from the AGS tank 110 overflows to the GDM tank 120 through the connector 150. The system 100 also includes an influent tank 130, which connects directly to an influent pump 180 by a first portion of a connector 160a, where the influent pump 180 in turn connects to the AGS tank 110 by a second portion of the connector 160b at a location near the bottom of the AGS tank 110. The AGS tank 110 also connects to a first air blower 190a by a connector 162. The GDM tank 120 connects to a second air blower 190b by a connector 164. The GDM tank 120 contains a connector 170 located near the bottom 121 of the tank, such that permeate from the GDM tank 120 can be directed out of the tank for reuse in non-potable and/or indirect potable applications, or flow to a treated water tank for storage.

As shown in FIG. 6, the wastewater treatment system 100' illustrates a different configuration of the AGS tank and GDM tank. The reference numbers and corresponding descriptions above with respect to system 100 generally apply to the system 100'. However, the proportions may be different. Thus the same reference numbers are used in FIG. 6, however, they are denoted with a prime symbol, e.g., AGS tank 110' and GDM tank 120'.

The difference between the system 100 and system 100' is that the AGS tank 110' and GDM tank 120' are integrated in one vessel 102. A barrier 104 divides the vessel into the AGS tank 110' and GDM tank 120'. Thus, the effluent from AGS tank 110' directly overflows to the GDM tank 120' without a connector.

III. Methods of Using the Wastewater Treatment System

The system disclosed herein is suitable for use in treating wastewater. Generally, the method of treating wastewater using the wastewater treatment system includes (i) cultivating aerobic granular biomass with wastewater in the AGS tank, and (ii) filtering effluent from the AGS tank in the GDM tank.

The disclosed system can be packed into a shipping container, which makes the system mobile, modular, and scalable. This containerized AGS/GDM system can be used as a decentralized wastewater treatment unit. Alternatively, the system can be used as a centralized treatment system, and expand the capacity of existing centralized treatment plant.

A. Cultivating Aerobic Granular Biomass with Wastewater in the AGS Tank

Typically, step (i) includes (1) feed, (2) aeration, (3) settling, and (4) draw. Steps (1)-(4) can be repeated in the same order. In embodiments where steps (1)-(4) are repeated, step (1) feed and step (4) draw can occur simultaneously, substantially simultaneously, or sequentially. For example, granular sludge treated effluent in the AGS tank is discharged from the AGS tank, while raw wastewater or primarily treated wastewater is fed into the AGS tank for granular sludge treatment. Alternatively, granular sludge treated effluent in the AGS tank is discharged from the AGS tank, after which raw wastewater or primarily treated wastewater is fed into the AGS tank for granular sludge treatment.

Optionally, step (i) is performed using a sequential batch reactor (SBR) system, as disclosed, for example, in Wang, et al., *Water Res.*, 124:702-712 (2017)), (the materials and methods of which are incorporated herein by reference), modified to include a feed/draw step as disclosed herein.

1. Feed

The feed step fills the AGS tank with wastewater and optionally, sludge, preferably by pumping from the bottom the tank with an influent pump. Typically, the wastewater is fed with an upward velocity of less than 7.5 m h$^{-1}$ without further mixing or aeration.

During the feed step, influent wastewater is fed into the AGS tank, preferably from the bottom of the tank, and flows under near-plug flow conditions through the settled granular biomass. Because of the plug flow, there is no contact between the granular sludge treated effluent at the top of the AGS tank and the raw wastewater at the bottom.

Up flow velocity produces dense, AGS aggregates with a diameter greater than 0.20 mm. The AGS aggregates have the same degree of settling in 5 min as that for 30 min in a SVI test with CAS. SVI is an index for sludge settling property. AGS can achieve the same sludge settling (SVI) in just 5 min which CAS achieves in 30 min. The feed period is anaerobic to promote enhanced biological phosphorus removal.

2. Aeration

In the aeration step, air or oxygen is pumped into the AGS reactor tank, preferably from the bottom of the tank by an air blower (see, e.g., FIG. 1 190*a* and FIG. 6, 190'*a*). The aeration step can last up to 10 hours, up to 8 hours, up to 5 hours, at least 30 minutes, at least 1 hour, between 1 and 5 hours, between 1 and 4 hours, between 1 and 3 hours, or between 1 and 2 hours.

The aeration step in the AGS reactor tank typically maintains the dissolved oxygen (DO) level in the wastewater in the AGS tank at least 0.1 mg/l, at least 0.2 mg/l, at least 0.5 mg/l, at least 1 mg/l, at least 1.5 mg/l, at least 2 mg/l, at least 2.5 mg/l, 3 up to 9 mg/l, up to 8 mg/l, up to 7.5 mg/l, up to 7 mg/l, up to 6.5 mg/l, up to 6 mg/l, up to 5 mg/l, between 0.2 to 2 mg/l, between 0.2 to 5 mg/l, between 0.2 to 0.5 mg/l, between 0.2 to 1.5 mg/l, between 0.2 to 2 mg/l, between 0.2 to 2.5 mg/l, between 0.2 to 3 mg/l, between 0.2 to 3.5 mg/l, between 0.2 to 4 mg/l, between 0.2 to 4.5 mg/l, between 0.5 to 2 mg/l, between 0.5 to 5 mg/l, between 1 to 5 mg/l, between 1.5 to 5 mg/l, between 2 to 5 mg/l, between 2.5 to 5 mg/l, between 3 to 5 mg/l, between 3.5 to 5 mg/l, or between 4 to 5 mg/l. Preferably, the DO level in the wastewater in the AGS tank is maintained between 0.5 to 2 mg/ml.

During the aeration step, all biological processes take place. Fine bubble aeration generates an oxygen gradient in the compact structure of the granular biomass. Simultaneous nitrification and denitrification occurs with nitrification in the outer layer of the granules and denitrification in the inner layers. At the aerobic outer layer of the granule, organic pollutants are efficiently oxidized. Nitrifying bacteria accumulate in the outer layer of the granules and convert ammonium to nitrate. The produced nitrate diffuses into the anoxic core of the granule where it is simultaneously denitrified. In addition enhanced and extensive biological phosphate fixation takes place. Stored carbon is oxidized by the phosphate accumulating organisms (PAOs) with phosphorus uptake. The oxygen transfer efficiency is higher due to the constant high liquid level and the uptake of COD in the anaerobic fill results in a more uniform oxygen uptake rate during aeration.

Aerobic granular sludge can be formed by applying specific process conditions that favor slow growing organisms such as PAOs (polyphosphate accumulating organisms) and GAOs (glycogen accumulating organisms). Another key part of granulation is selective wasting whereby slow settling floc-like sludge is discharged as waste sludge and faster settling biomass is retained.

3. Settling

During the settling step, the biomass is separated from the treated effluent. As a result of the characteristics of the granular biomass, the required duration for settling is short and this phase is also used to discharge excess biomass formed as a result of growth and accumulation during the aeration phase.

The settling step allows the granular biomass to settle within a short period of time. Typically, the settling time is up to 30 minutes, up to 20 minutes, up to 15 minutes, up to 12 minutes, up to 10 minutes, up to 9 minutes, up to 8 minutes, up to 7 minutes, up to 6 minutes, up to 5 minutes, up to 4 minutes, up to 3 minutes, up to 2 minutes, between 3 to 5 minutes, between 3 to 6 minutes, between 3 to 7 minutes, between 3 to 8 minutes, between 3 to 9 minutes, between 3 to 10 minutes, between 5 to 10 minutes, between 5 to 15 minutes or between 5 to 30 minutes. Preferably, the settle time is less than 15 minutes. For example, the settling time is less than 15 minutes, less than 9 minutes, less than 8 minutes, less than 7 minutes, less than 6 minutes, less than 5 minutes.

4. Draw

The draw step discharges granular sludge treated effluent from the top of the tank to the GDM tank. Typically, the effluent at the top of the AGS tank overflows from the AGS tank to the GDM tank either directly or through a connector connecting the AGS tank and the GDM tank. Optionally, raw wastewater or primarily treated wastewater is fed into the AGS from the bottom of the AGS tank, and granular sludge treated effluent is drawn from the top of the AGS tank and into the GDM tank simultaneously or substantially simultaneously.

B. Filtering Effluent from the AGS Tank in the GDM Tank

The effluent is typically filtered in the GDM tank using one or more gravity-driven membrane(s). Effluent overflows from the AGS tank into the GDM tank, and flows through the membrane unit attached at the bottom or near the bottom of the GDM tank driven by gravity . . . . Typically, the hydrostatic pressure (water head pressure above the membrane) drives the filtration through the porous membranes in the membrane unit.

Typically, the height from the water level in the GDM tank to the top layer of the membrane unit is defined as hydraulic head "H" (see, e.g., H in FIGS. 1 and 6). Typically, H is at least 40 cm, at least 50 cm, at least 60 cm, at least 70 cm, at least 80 cm, or at least 1 meter. The hydraulic head impacts the permeate flux. Increase in H typically corresponds to increase in mbar of pressure, leading to an increase of flux. For example, the permeate flux can be increased by 200% by increasing H from 40 cm to 4-5 meters. Thus, by increasing H, the production of permeate can be increased, enhancing the flexibility of the treatment process for different loading.

Optionally, an air blower is used to pump air into the GDM tank continuously or intermittently from the bottom of the GDM tank for production of air bubbles for scouring porous membrane(s) (bio)foulants.

Optionally, the method includes collecting permeate (filtered effluent) from the GDM tank into a treated water tank during or after step (ii). Typically, the permeate flows from the GDM tank into the treated water tank through a connector that connects the membrane unit of the GDM tank and the treated water tank.

Water collected from the GDM tank after filtering through the membrane unit has high quality (low turbidity, organic carbon and nutrients for example, >80% removal efficiency for example, up to 85%, up to 90%, and up to 95% removal efficiency) for discharge in the nature limits absence of nutrients and carbon. Permeate collected from the GDM tank is free of nutrients and can be used for non-potable and indirect potable applications, like irrigation, gardening, floor cleaning, toilet flushing, etc.

Optionally, the method includes measuring the quality of the permeate during or after step (ii). Alternatively, the quality of the permeate can be measured during or after flowing it into the treated water tank.

The permeate collected from the disclosed system can be used for potable reuse applications, or non-potable reuse application, such as toilet flushing, floor washing, irrigation, etc.

The process disclosed herein results in the porous membrane(s) in the GDM tank having minimal and/or low fouling.

Membrane fouling is mostly attributed to pore blocking and cake layer formation and accumulation. When some small colloidal and soluble organics, such as extracellular polymeric substances (EPS) and soluble microbial products (SMP), are flushed onto membrane surfaces, they can get lodged within the membrane pores causing pore blocking. Larger particles that particles cannot go into the pores due to the size exclusion may be deposited as a dense layer on the membrane surface, causing increase in overall hydraulic resistance of the system. In addition, the granular sludge (biomass), organics, and nutrients can lead to growth of bacterial biofilm on the membrane surface called biofouling.

The minimal and/or low fouling with the described wastewater treatment system and method is because: (1) most of the organics are removed in the AGS tank, which is physically separated or divided from the GDM tank; (2) granular biomass grow as granules in AGS tank, such that minimal amount of sludge enters into the GDM tank.

The disclosed systems and methods can be further understood through the following numbered paragraphs.

1. A wastewater treatment system comprising an aerobic granular sludge (AGS) tank coupled to a gravity-driven membrane (GDM) tank comprising one or more membrane(s).
2. The system of paragraph 1, further comprising an influent tank, sludge tank, a treated water tank, and/or a control unit.
3. The system of paragraph 1 or paragraph 2, wherein the one or more gravity-driven membrane(s) forms a membrane unit.
4. The system of any one of paragraphs 1-3, wherein the membrane unit includes single or multiple modules.
5. The system of any one of paragraphs 1-4, wherein the modules include flat sheet or hollow fiber modules.
6. The system of any one of paragraphs 1-5, wherein the one or more gravity-driven membrane(s) are porous membrane(s) made of inorganic or organic porous materials.
7. The system of paragraph 6, wherein the inorganic or organic porous materials are ceramic or polymer based materials.
8. The system of paragraph 7, wherein the polymer based materials are cellulose acetate, polyvinylidene fluoride, polyvinyl chloride, polyacrylonitrile, polypropylene, polyethylene, polysulfone, polyether sulfone, polytetrafluoroethylen or combinations thereof.
9. The system of any one of paragraphs 6-8, wherein the porous membrane has a pore size is between 0.001 µm to 1 µm, between 0.01 µm to 0.1 µm, 0.01 µm to 0.5 µm, 0.01 µm to 1 µm, 0.1 µm to 1 µm, 0.5 µm to 1 µm.
10. The system of any one of paragraphs 1-9, wherein the GDM tank has a height in the range between 1 to 2 meters, between 1 to 3 meters, between 1 to 4 meters, between 1 to 5 meters, between 1 to 6 meters, between 1 to 7 meters, between 1 to 8 meters, between 1 to 9 meters, or between 1 to 10 meters.
11. The system of any one of paragraphs 1-10, wherein the system further comprises a first pipe at the top of the AGS tank connected to the GDM tank
12. The system of any one of paragraphs 1-11, wherein the system further comprises a first air blower connected to the bottom of the GDM tank.
13. The system of any one of paragraphs 1-12, wherein the GDM tank comprises air diffusors linked to an air blower.
14. The system of any one of paragraphs 3-13, wherein the membrane unit is attached at the bottom of the GDM tank.
15. The system of any one of paragraphs 3-14, wherein the membrane unit is connected to the treated water tank through a second pipe.
16. The system of any one of paragraphs 1-15, wherein the GDM tank further comprises a level transmitter.
17. The system of any one of paragraphs 1-16, wherein the AGS reactor tank has a height in the range between 1 to 2 meters, between 1 to 3 meters, between 1 to 4 meters, between 1 to 5 meters, between 1 to 6 meters, between 1 to 7 meters, between 1 to 8 meters, between 1 to 9 meters, or between 1 to 10 meters.
18. The system of any one of paragraphs 1-17, wherein the system further comprises an influent pump operatively connected to the AGS tank.
19. The system of any one of paragraphs 1-18, wherein the AGS tank comprises air diffusors linked to an air blower.
20. The system of any one of paragraphs 1-19, wherein the AGS tank connected to an influent pump through a third pipe at the bottom of the AGS tank.
21. The system of paragraph 20, wherein the influent pump is connected to an influent tank.
22. The system of any one of paragraphs 1-21, wherein the AGS tank is connected to the GDM tank through a first connector.
23. The system of paragraph 22, wherein the first connector is located at 50%, 65%, 70%, 75%, 80%, 85%, 90%, 95% or 100% of the height of the AGS tank.
24. The system of any one of paragraphs 1-23, wherein the AGS tank is connected to a sludge tank through a second connector.
25. The system of paragraph 24, wherein the second connector is located at between 25% to 60%, between 30% to 60%, between 40% to 60%, between 40% to 50%, between 45% to 65%, or between 45% to 55% of the height of the AGS tank.
26. The system of any one of paragraphs 1-25, wherein the system comprises one or more sensors and/or one or more actuators for controlling operational parameters.
27. The system of any one of paragraphs 2-26, wherein the influent tank contains raw wastewater or primarily treated raw water.
28. The system of any one of paragraphs 2-27, wherein the treated water tank contains non-potable and indirect potable water.
29. The system of any one of paragraphs 2-28, wherein the control unit comprises a graphical program to measure, record, control and regulate parameters in the AGS reactor tank, influent tank, membrane tank, and treated water tank.
30. The system of any one of paragraphs 2-29, wherein the control unit comprises an influent pump switch, an air pump/blower switch, a tank level switch, a tank level switch, controls to regulate culture parameters, controls to operate the sequential operational modes in the AGS reactor tank.

31. A method of making the wastewater treatment system of any one of paragraphs 1-30 comprising:
    connecting the influent pump to the bottom of the AGS reactor tank via a pipe;
    connecting the AGS reactor tank at the top of the tank through a pipe to the membrane tank;
    connecting an sludge tank through a pipe to the AGS reactor tank at between 40% to 60% of the height of the AGS reactor tank;
    attaching the membrane unit to the bottom of the membrane tank; and
    connecting the membrane unit to the treated water tank through a pipe.
32. The method of paragraph 31, further comprising connecting the influent tank containing wastewater and sludge to the influent pump.
33. The method of paragraph 31 or paragraph 32, further comprising attaching an air pump/blower at the bottom of the AGS tank.
34. The method of any one of paragraphs 31-33, further comprising attaching one or more sensors and/or one or more actuators for controlling culture parameters in the AGS tank.
35. A method of using the wastewater treatment system of any one of paragraphs 1-30 comprising:
    (i) cultivating aerobic granular sludge in the AGS reactor tank, and
    (ii) filtering the effluent in the membrane tank using one or more gravity-driven membrane(s) to produce permeate.
36. The method of paragraph 35, wherein the aerobic granular sludge in the AGS reactor tank is cultured using a sequential batch reactor (SBR) system.
37. The method of paragraph 35 or paragraph 36, wherein step (i) comprises:
    (1) feed,
    (2) aeration,
    (3) settling, and
    (4) draw.
38. The method of paragraph 37, wherein the aeration step maintains the oxygen level in the wastewater in the tank between 0.2 to 5 mg/l, between 0.2 to 0.5 mg/l, between 0.2 to 1.5 mg/l, between 0.2 to 2 mg/l, between 0.2 to 2.5 mg/l, between 0.2 to 3 mg/l, between 0.2 to 3.5 mg/l, between 0.2 to 4 mg/l, between 0.2 to 4.5 mg/l, between 0.5 to 5 mg/l, between 1 to 5 mg/l, between 1.5 to 5 mg/l, between 2 to 5 mg/l, between 2.5 to 5 mg/l, between 3 to 5 mg/l, between 3.5 to 5 mg/l, or between 4 to 5 mg/l.
39. The method of paragraph 37 or paragraph 38, wherein in the aeration step, air or oxygen is pumped into the AGS tank from the bottom of the tank by an air pump.
40. The method of any one of paragraphs 37-39, wherein the settling step allows the granular biomass to settle in the AGS reactor tank for between 3 to 5 minutes, between 3 to 6 minutes, between 3 to 7 minutes, between 3 to 8 minutes, between 3 to 9 minutes, between 3 to 10 minutes, between 5 to 10 minutes, between 5 to 15 minutes, or between 5 to 30 minutes.
41. The method of any one of paragraphs 37-40, wherein the feed step fills the AGS tank with wastewater and sludge by pumping from the bottom with an upward velocity of less than 5 m h-1 without further mixing or aeration.
42. The method of any one of paragraphs 37-41, wherein the steps (1)-(4) can be repeated in the same order.
43. The method of any one of paragraphs 35-42, wherein in step (i), the aerobic granular sludge aggregates to a diameter greater than 0.20 mm.
44. The method of any one of paragraphs 35-43, wherein the effluent flows from the top of the AGS tank into the GDM tank, and flows through the membrane unit attached at the bottom of the GDM tank.
45. The method of any one of paragraphs 35-44, wherein the filtration is driven by the water head pressure above the membrane unit.
46. The method of any one of paragraphs 35-45, further comprising pumping air or oxygen into the GDM tank from the bottom of the tank for production of air bubbles for scouring porous membrane (bio)foulants.
47. The method of any one of paragraphs 35-46, wherein the permeate from the membrane tank flows into a treated water tank, or can be used directly for non-potable and indirect potable applications.
48. The method of any one of paragraphs 35-47, wherein the permeate collected in the treated water tank has high quality.
49. The method of any one of paragraphs 35-48, wherein the permeate collected in the treated water tank contains less nutrients.
50. The method of any one of paragraphs 35-49, wherein the permeate collected in the treated water tank is used for non-potable and indirect potable applications.
51. The system of any one of paragraphs 1-30, are packed into a shipping container
52. The system of any one of paragraphs 1-30, are used for centralized treatment system.
53. The system of any one of paragraphs 1-30, are used to expand the capacity of existing centralized treatment plant.
54. The permeate produced from the system of any one of paragraphs 1-30, is used for non-potable reuse application, toilet flushing, floor washing, irrigation, etc.
55. The system of paragraph 51, wherein the containerized system uses a decentralized wastewater treatment unit.
56. The method of any one of paragraphs 37-50, wherein step (1) and step (4) are performed simultaneously, substantially simultaneously, or sequentially.

EXAMPLE

Materials and Methods

Flux stabilization and effluent quality were measured according to the methods disclosed in Wang, et al., ", *Sep. Purif. Technol.*, 184:26-33 (2017), incorporated herein by reference.

AGS Reactor Operation.

The aerobic granular sludge in the AGS tank may be cultivated using a sequential batch reactor (SBR) system, as disclosed for example, in Wang, et al., Water Res., 124:702-712 (2017)), (the materials and methods of which are incorporated herein by reference)

Flux Stabilization

The GDM reactor was operated with AGS produced effluent under a constant gravitational pressure of 45 mbar (4.5 kPa) supported by the water head for 7 weeks.

The weight of permeated water (or effluent) was measured every day during the whole operation to get the daily flux regarding the effective membrane area of 0.0045 m$^2$. J=dQ/A(dt), where, J (L/m$^2$/h, LMH) is the permeate flux, Q (L) is the quantity of the permeation water filtered through the membrane, A (m²) is the effective surface area of the membrane, and t (h) is the time interval between two measurements.

In addition, the hydraulic resistance (m⁻¹, R) was calculated based on Darcy's law:

$R_{total} = TMP/\mu_{20°C} \cdot J_{20°C}$, where, TMP is the transmembrane pressure which is around 45 mbar constantly in this case, and $\mu_{20°C}$ is the permeate viscosity at temperature 20° C., $J_{20°C}$ is the flux measured in the experiment.

Effluent Quality

Permeate (or effluent) samples were collected at regular intervals and filtered through 0.45 μm syringe filters. Chemical oxygen demand (COD) and total nitrogen concentrations in samples were measured by HACH kits (HACH, CO, USA). User's guide was followed for these kits and finally concentrations were measured by spectrophotometer (D5000, HACH, CO, USA).

An optical coherence tomography (OCT) system was used in this study to investigate the fouling formation and development in micrometer scale. A central wavelength of 930 nm was provided by the system to penetrate the sample to create depth profile. The OCT probe was equipped with a 5× telecentric lens, allowing scanning an area of 4.0_1.8 mm A defined position was scanned every day at a relatively fixed time for fouling monitoring. The images were optimized to remove the background noise for higher identification, and then were analyzed by a customized MATLAB code to measure the thickness of fouling layer in pixel unit. Then, according to the original information of pixel size from the OCT scanning, the real average thickness (Z,mm) of biofilm was corrected and calculated (See Wang, et al., ", Sep. Purif. Technol., 184:26-33 (2017)).

Results

A. Flux Stabilization

Flux stabilization was tested at a lab-scale. A flux stabilization in the range of 4-12 liter per m² per hour (LMH) was achieved without need of backwashing by a GDM system filtering effluent produced by the AGS reactor (see FIG. 2). The observed stable flux was comparable with the range of flux (2-20 LMH) previously reported for different GDM system (Wang, Y., et al., "Gravity-driven membrane system for secondary wastewater effluent treatment: Filtration performance and fouling characterization", Sep. Purif. Technol., 184:26-33 (2017)).

B. Effluent Quality

Figure 4:
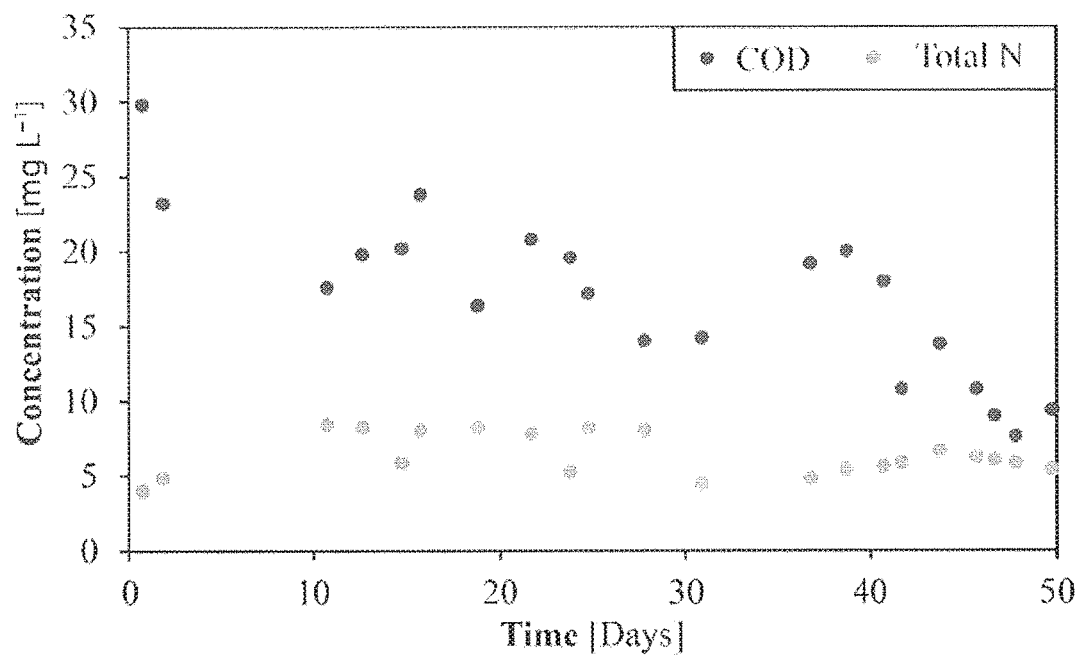
FIG. 4 is a graph of the effluent chemical oxygen demand (COD) and total nitrogen concentrations.

The measurements of effluent quality indicated satisfying removal efficiency in the system (see FIG. 3). As indicated by the data in FIG. 3 ammonium and nitrate were below the detection limit. OCT (optical coherence tomography) scanning confirmed a dynamic evolution of the biomass deposited on the membrane (see FIG. 4). Acquirement of morphology descriptors (i.e. thickness, relative roughness, absolute roughness and porosity) matched well with flux and resistance variation. These results supported the use of GDM process for a long-term operation of AGS-produced effluent treatment.

We claim:

1. A wastewater treatment system comprising an aerobic granular sludge (AGS) tank coupled to a gravity-driven membrane (GDM) tank comprising one or more gravity-driven membrane(s), wherein the one or more gravity-driven membrane(s) forms a membrane unit that is attached to the bottom or near the bottom of the GDM tank, and wherein the AGS tank and the GDM tank are integrated in a single vessel and divided by a barrier, and the AGS tank and the GDM tank are configured such that when in use, an effluent overflows unidirectionally from the AGS tank into the GDM tank via the top of the GDM tank, wherein effluent cannot flow from the GDM tank into the AGS tank.

2. The system of claim 1, further comprising: (a) an influent tank, a sludge tank, a treated water tank, and/or a control unit; (b) a first air blower connected to the bottom of the GDM tank, and optionally an air diffusor in the GDM tank linked to the first air blower, and/or (c) an influent pump operatively connected to the AGS tank, optionally the AGS tank is connected to the influent pump through a second pipe at the bottom of the AGS tank.

3. The system of claim 2, wherein the AGS tank is connected to the sludge tank through a third pipe, and wherein the third pipe is located at between 25% to 60%, between 30% to 60%, between 40% to 60%, between 40% to 50%, between 45% to 65%, or between 45% to 55% of the height of the AGS tank.

4. The system of claim 2, wherein: (a) the influent tank contains raw wastewater or primarily treated raw water; (b) the treated water tank contains non-potable and indirect potable water; (c) the control unit comprises a graphical program to measure, record, control and regulate parameters in the AGS reactor tank, influent tank, membrane tank, and treated water tank; (d) the control unit comprises an influent pump switch, an air pump/blower switch, a tank level switch, controls to regulate culture parameters, and/or controls to operate the sequential operational modes in the AGS reactor tank; and/or (e) the treated water tank is connected to the membrane unit through a fourth connector.

5. The system of claim 1, wherein: (a) the membrane unit includes single or multiple modules optionally, the modules comprise flat sheet or hollow fiber modules; (b) the one or more gravity-driven membrane(s) are porous membrane(s) made of inorganic or organic porous materials; and/or (c) the GDM tank has a height in the range between 1 to 2 meters, between 1 to 3 meters, between 1 to 4 meters, between 1 to 5 meters, between 1 to 6 meters, between 1 to 7 meters, between 1 to 8 meters, between 1 to 9 meters, or between 1 to 10 meters.

6. The system of claim 5, wherein: (a) the inorganic or organic porous materials are ceramic or polymer based materials; (b) the porous membrane has a pore size is between 0.001 μm to 1 μm, between 0.01 μm to 0.1 μm, 0.01 μm to 0.5 μm, 0.01 μm to 1 μm, 0.1 μm to 1 μm, 0.5 μm to 1 μm; and/or (c) wherein the membrane unit is in a plane parallel to the plane of the bottom of the GDM tank.

7. The system of claim 6, wherein the inorganic or organic porous materials are cellulose acetate, polyvinylidene fluoride, polyvinyl chloride, polyacrylonitrile, polypropylene, polyethylene, polysulfone, polyether sulfone, or polytetrafluoroethylene, or combinations thereof.

8. The system of claim 1, wherein: (a) the GDM tank further comprises a level transmitter; (b) the AGS reactor tank has a height in the range between 1 to 2 meters, between 1 to 3 meters, between 1 to 4 meters, between 1 to 5 meters, between 1 to 6 meters, between 1 to 7 meters, between 1 to 8 meters, between 1 to 9 meters, or between 1 to 10 meters; and/or (c) the AGS tank comprises air diffusors linked to a second air blower.

9. The system of claim 1, further comprising one or more sensors and/or one or more actuators for controlling operational parameters.

10. A method of making the wastewater treatment system of claim 1 comprising:

dividing a vessel with said barrier into the AGS tank and the GDM tank and attaching the membrane unit to the bottom or near the bottom of the GDM tank.

11. The method of claim 10, further comprising: (a) attaching an air pump/blower at the bottom of the AGS tank; (b) attaching one or more sensors and/or one or more actuators for controlling culture parameters in the AGS tank; (c) connecting an influent tank containing wastewater and sludge to an influent pump; (d) connecting the influent pump to the bottom of the AGS reactor tank via a second pipe; (e) connecting a sludge tank through a third pipe to the AGS reactor tank at between 40% to 60% of the height of the AGS reactor tank; (f) connecting the membrane unit to the treated water tank through a fourth pipe.

12. A method of using the wastewater treatment system of claim 1 comprising:
 (i) cultivating aerobic granular sludge in the AGS tank, and
 (ii) filtering the effluent in the membrane tank using said one or more gravity-driven membrane(s) to produce permeate.

13. The method of claim 12, wherein: (a) the aerobic granular sludge in the AGS tank is cultured using a sequential batch reactor (SBR) system; (b) in step (i), the aerobic granular sludge aggregates to a diameter greater than 0.20 mm; (c) the effluent flows from the top of the AGS tank into the GDM tank, and flows through the membrane unit attached at the bottom of the GDM tank; and/or (d) the filtration is driven by the water head pressure above the membrane unit.

14. The method of claim 12, wherein step (i) comprises:
 (1) feed,
 (2) aeration,
 (3) settling, and
 (4) draw;
wherein the aerobic granular sludge aggregates to a diameter greater than 0.20 mm during the feed step, the aeration step, the settling step, and/or the draw step.

15. The method of claim 14, wherein: (a) the aeration step maintains the oxygen level in the wastewater in the tank between 0.2 to 5 mg/l, between 0.2 to 0.5 mg/l, between 0.2 to 1.5 mg/l, between 0.2 to 2 mg/l, between 0.2 to 2.5 mg/l, between 0.2 to 3 mg/l, between 0.2 to 3.5 mg/l, between 0.2 to 4 mg/l, between 0.2 to 4.5 mg/l, between 0.5 to 5 mg/l, between 1 to 5 mg/l, between 1.5 to 5 mg/l, between 2 to 5 mg/l, between 2.5 to 5 mg/l, between 3 to 5 mg/l, between 3.5 to 5 mg/l, or between 4 to 5 mg/l; (b) in the aeration step, air or oxygen is pumped into the AGS tank from the bottom of the tank by an air pump; (c) the settling step allows the granular biomass to settle in the AGS tank for between 3 to 5 minutes, between 3 to 6 minutes, between 3 to 7 minutes, between 3 to 8 minutes, between 3 to 9 minutes, between 3 to 10 minutes, between 5 to 10 minutes, between 5 to 15 minutes, or between 5 to 30 minutes; (d) the feed step fills the AGS tank with wastewater and sludge by pumping from the bottom with an upward velocity of less than 5 m/h without further mixing or aeration; (e) the steps (1)-(4) are repeated in the same order; and/or (f) step (1) and step (4) are performed simultaneously, substantially simultaneously, or sequentially.

16. The method of claim 12, further comprising pumping air or oxygen into the GDM tank from the bottom of the tank for production of air bubbles for scouring porous membrane (bio) foulants.

\* \* \* \* \*